S. G. ZUCKERMAN.
PHOTOGRAPHIC PLATE HOLDER.
APPLICATION FILED MAR. 5, 1915.
1,267,159.
Patented May 21, 1918.
2 SHEETS—SHEET 2.
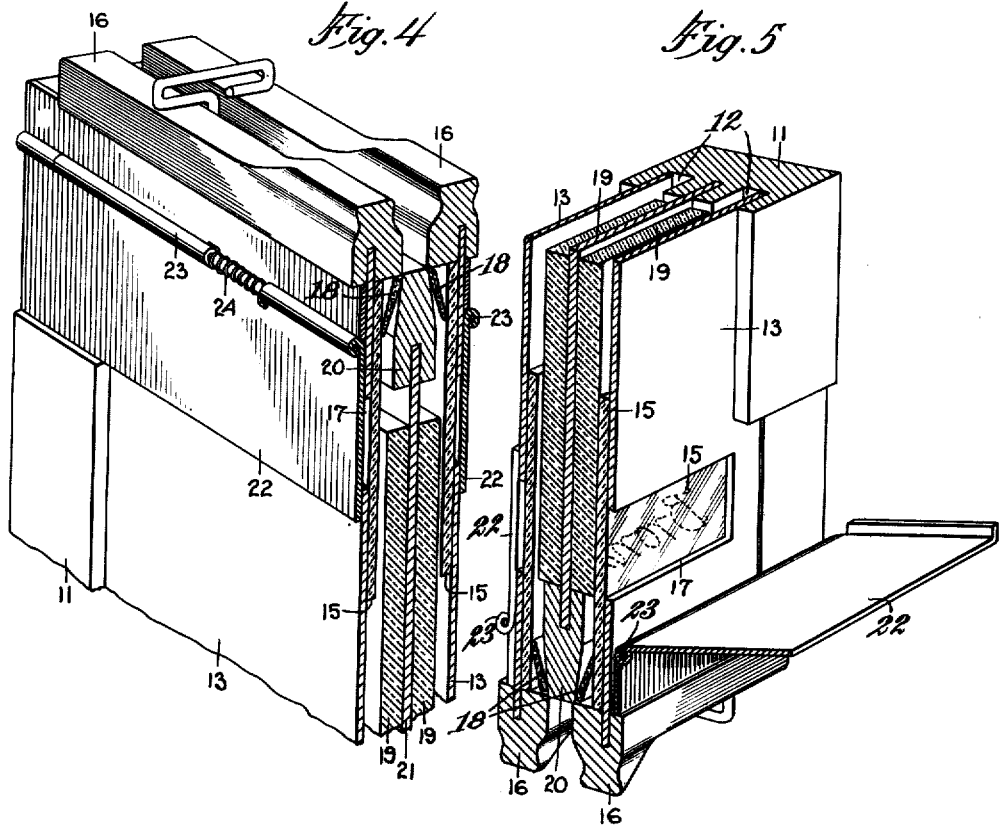
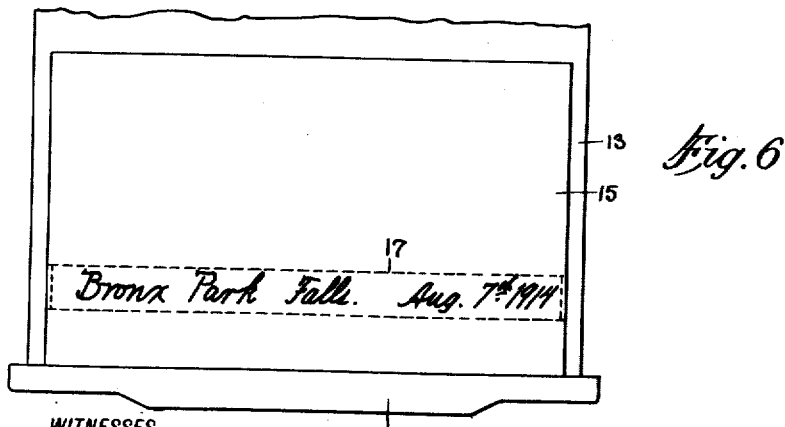
WITNESSES
INVENTOR
Samuel G. Zuckerman
BY
ATTORNEYS

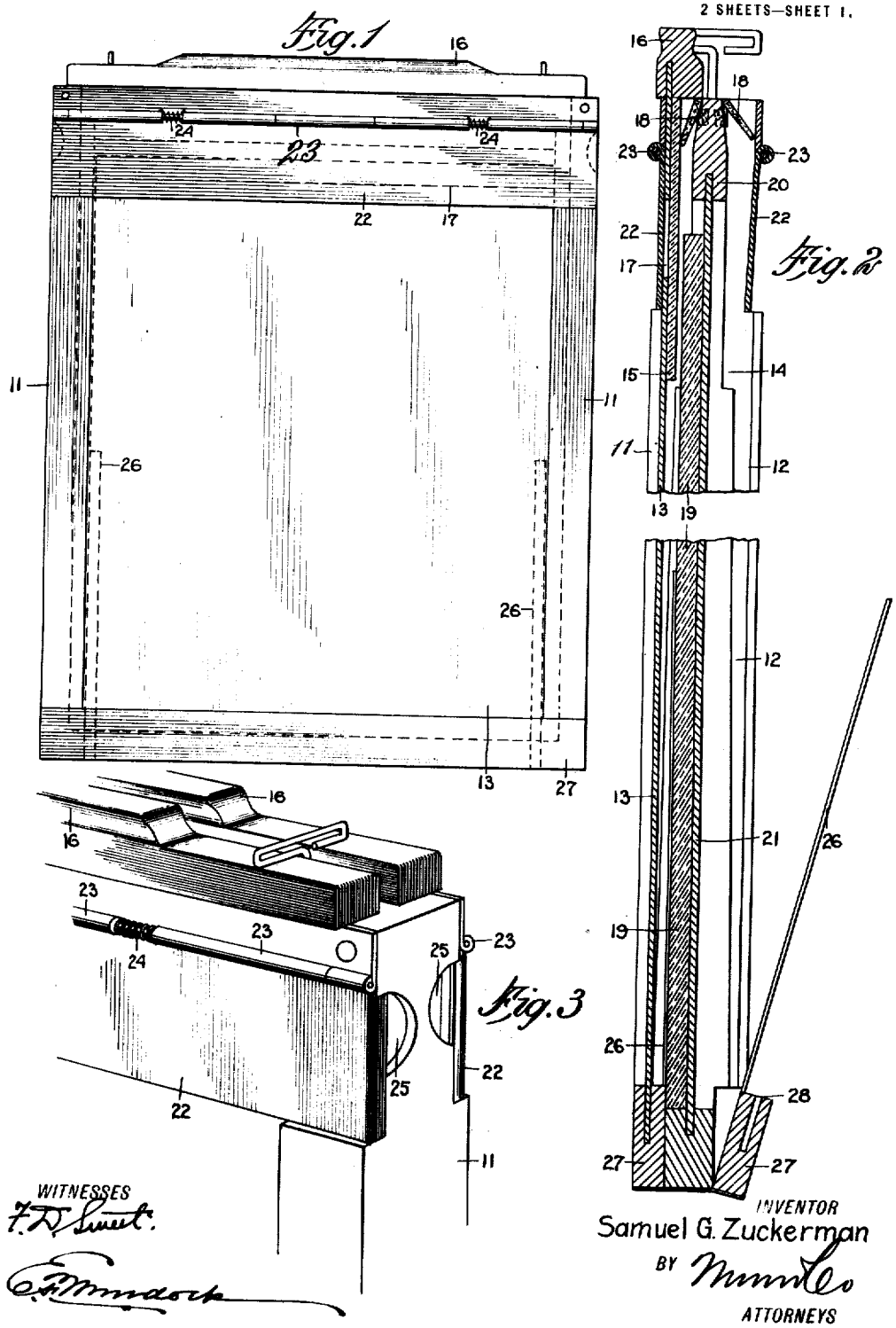

UNITED STATES PATENT OFFICE.

SAMUEL G. ZUCKERMAN, OF NEW YORK, N. Y.

PHOTOGRAPHIC-PLATE HOLDER.

1,267,159.    Specification of Letters Patent.    Patented May 21, 1918.

Application filed March 5, 1915. Serial No. 12,233.

*To all whom it may concern:*

Be it known that I, SAMUEL G. ZUCKERMAN, a citizen of the United States, and a resident of the city of New York, borough of the Bronx, in the county of Bronx and State of New York, have invented a new and Improved Photographic-Plate Holder, of which the following is a full, clear, and exact description.

Among the principal objects which the present invention has in view are the following:—To provide means for transferring an inscription to a photographic plate, to be developed with the remainder of the negative; to impart to the photographic plate, as a part of the original exposure thereof, an inscription, the reproduction of which on photographic prints will resemble in character that of pencil or ink on white or light paper, rendering thereby possible the forming of light or white margins for photographic prints; and to provide for placing the inscription above mentioned upon the field of the photographic prints.

*Drawings.*

Figure 1 is a side view of a plate holder constructed and arranged in accordance with the present invention;

Fig. 2 is a vertical cross section on an enlarged scale of said plate holder, the figure being broken and contracted;

Fig. 3 is a detail view in perspective and on a magnified scale, showing a corner fragment of a plate holder constructed and arranged in accordance with the present invention;

Fig. 4 is a detail view on a magnified scale, showing partly in section and partly in perspective, a corner fragment of a plate holder constructed and arranged in accordance with the present invention, said holder being charged and having two plates held therein, said holder being further shown as in the upright or normal position;

Fig. 5 is a view of the structure shown in Fig. 4, the same being inverted, and of the shutter for exposing the inscription on the plate; and Fig. 6 is a side view of an end fragment of a slide for a plate holder constructed and arranged in accordance with the present invention, showing the inscription as having been written thereon.

As seen in the drawings, the plate holder is arranged to hold two plates and covering slides therefor. To receive the said slides the side frame members 11 are provided with grooves 12. The grooves 12 are widened at the upper ends to hold the slides 13 in such manner that they may be pressed into close contact with the sensitized plates 19. In the present construction, the grooves 12 are enlarged near the top of the frame to form an offset 14, which normally receives and holds a transparent strip 15, such as glass, celluloid or similar material, prepared to receive a written inscription, said strip being shown best in Fig. 2 of the drawings.

The slides 13 when constructed in accordance with the present invention are each provided with a handle bar 16. Adjacent the said bar and parallel therewith, the slide has a slot 17, formed therein, extending across the said slide. Said strip is permanently attached to the inner face of the slide 13. The plate holders are arranged with flexible light stops 18 of conventional formation. Normally when the slide 13 is in position the stops 18 rest against the inner surface of the strip 15. The strip 15, when the slide 13 is in the holder, rests in the offset 14 and slightly removed from the prepared plate 19.

The plate holder is provided with oppositely situated shutters 22. The shutters 22 are hinged by the pins 23 to the side members 11 and top rail 20 and are adapted to be held firmly upon the slides 13, and when the same are in position, to cover the slots 17 formed therein. In order to insure the exclusion of light from the slot 17, the shutter 22 is made wide enough to lap over the opaque slide 13 a certain distance below the lower edge of the slot 17. The shutters 22 are maintained in service relation by springs 24, as best shown in Fig. 3 of the drawings. To operate the shutters 22, finger holds 25 are provided in the members 11, as shown best in Fig. 3 of the drawings.

As hereinafter described, the slide 13 and shutter 22 are never, respectively, removed and opened at the same time while the holder is loaded. When the shutter 22 is in normal position and the slide 13 is removed, the area of the plate 19 below the lower edge of the shutter 22 is exposed to receive the photographic impression. When the slide 13 is in normal position and the shutter 22 is opened, the area of the plate 19 above the lower edge of the slot 17 is exposed to receive the inscription; there is thus a strip between the lower edge of the slot 17 and the lower edge of the shutter 22 on the plate 19 that would never be exposed. To prevent an unsightly black strip on the photographic print, due and corresponding to the unexposed strip of the plate just described, a space is provided between the top of the plate 19 and the top rail 20, as seen best in Figs. 2 and 4 of the drawings, equal to that between the lower edge of the shutter 22 and the lower edge of the slot 17 (when both are in normal position), permitting the plate 19 to be shifted upward until it touches the top rail 20, or, which is the same, until the line of the photographic impression on the plate originally coinciding with the lower edge of the shutter 22 coincides with the lower edge of the slot 17, thus removing the objectionable feature of an unexposed strip.

The usual supporting springs for the sensitized plate are dispensed with and in lieu thereof there is employed two leaf springs 26. The springs 26 are mounted on the hinged sections 27, forming parts of the lower rail of the frame. When the sections 27 are disposed to receive in the groove 28 the ends of the slides 13, the springs 26 bear upon the plates 19 with sufficient force to steady them in position. When later, however, the plates are shifted to expose the upper ends thereof, the springs 26 permit the movement of the said plates.

Operation.

With plate holders constructed and arranged as disclosed, the operation is as follows: The plates 19 are loaded in the holder and the slides 13 are then inserted to cover the same. The lower ends of the slides 13 are introduced in the grooves 28 in the section 27, said sections being closed. The springs 26 rest against the plate 19. When inserting the slides 13 in the manner indicated, the light stops 18 and the shutters 22 are displaced to make room for the slides 13 and the glass strips 15 mounted thereon.

The plate holder, being loaded, is placed in the camera. The slide 13 is then removed to expose the said plate 19 to receive the photographic impression when the shutter of the camera is operated. While the slide 13 is removed, the operator overturns it to dispose the transparent strip 15 uppermost, as shown in Fig. 6 of the drawings. Upon the strip 15, and opposite the slot 17, the operator writes an inscription indicating the subject of the photograph. The slide 13 is now replaced and the holder removed.

The holder may be removed and inverted to the position shown in Fig. 5 of the drawings. The plates 19 are now shifted to rest on the top rail 20, the springs 26 yielding sufficiently to permit the plates 19 to thus move. It will be noted that the inscription area of the plates above described is now moved to be exposed through the slot 17. The plates being thus disposed, the operator lifts the shutter to permit the light to pass through the glass strip 15. Simultaneously the slide 13 and strip 15 are pressed back so that the part of the strip 15 bearing the inscription rests firmly on the plate 19. The light stops 18 yield sufficiently to permit the action.

It will now be observed that the opaque lines of the inscription with which the strip 15 has been provided obstruct the light rays and produce on the negative a relatively light or transparent inscription. When the photograph is now printed, it will be found that the inscription prints in black lines.

While I have herein described the invention as applied to a plate holder, it will be understood that the same is equally applicable to a film holder and such application is claimed by me as a part of the present invention.

Claims.

1. A photographic plate holder having a recess for receiving a sensitized plate, said recess being longer than the plate held thereby; a cover slide for said recess, said slide having an aperture coincident with one end of said recess when in service; and means normally covering said aperture to prevent the passage of light therethrough, said means being manually operative to permit the passage of light through said aperture.

2. A photographic plate holder having a recess for receiving a sensitized plate, said recess being longer than the plate held thereby; a cover slide for said recess, said slide having an aperture coincident with one end of said recess when in service; means normally covering said aperture to prevent the passage of light therethrough, said means being manually operative to permit the passage of light through said aperture; and a transparent medium mounted on said slide covering said aperture, said medium being adapted to support an inscription thereon.

3. A photographic plate holder having a recess for receiving a sensitized plate, said recess being longer than the plate held thereby; a cover slide for said recess, said slide having an aperture coincident with one end of said recess when in service; means normally covering said aperture to prevent the passage of light therethrough, said means being manually operative to permit the passage of light through said aperture; and a transparent medium mounted on said slide covering said aperture, said medium being adapted to have imparted thereto and to the inner surface thereof, an inscription for photographically printing on the sensitized surface of said plate.

In witness whereof I have signed my name to this specification in the presence of two subscribing witnesses.

SAMUEL G. ZUCKERMAN.

Witnesses:
 E. B. MADOCK,
 PHILIP D. ROLLHAUS.